US012774234B2

(12) United States Patent
Sun et al.

(10) Patent No.: US 12,774,234 B2

(45) Date of Patent: Oct. 27, 2026

(54) HARMLESS AND RECYCLING TREATMENT METHOD FOR KITCHEN WASTE

(71) Applicant: Shenzhen Research Institute of Northwestern Polytechnical University, Shenzhen City (CN)

(72) Inventors: Ran Sun, Shenzhen City (CN); Bin Xie, Shenzhen City (CN); Wenzhuo Li, Shenzhen City (CN); Sihai Hu, Shenzhen City (CN); Yaoguo Wu, Shenzhen City (CN); Xiaofeng Sun, Shenzhen City (CN)

(73) Assignee: Shenzhen Research Institute of Northwestern Polytechnical University, Shenzhen City (CN)

( * ) Notice: Subject to any disclaimer, the term of this patent is extended or adjusted under 35 U.S.C. 154(b) by 453 days.

(21) Appl. No.: 18/486,462

(22) Filed: Oct. 13, 2023

(65) Prior Publication Data

US 2024/0101459 A1 Mar. 28, 2024

(51) Int. Cl.

| | |
|---|---|
| ***C02F 9/00*** | (2023.01) |
| ***B01D 17/04*** | (2006.01) |
| ***B09B 3/60*** | (2022.01) |
| ***B09B 3/70*** | (2022.01) |
| ***B09B 101/70*** | (2022.01) |
| ***C02F 1/00*** | (2023.01) |
| ***C02F 1/66*** | (2023.01) |
| ***C02F 1/72*** | (2023.01) |
| ***C02F 3/12*** | (2023.01) |
| ***C02F 3/30*** | (2023.01) |
| ***C02F 3/34*** | (2023.01) |

(52) U.S. Cl.

CPC .............. *C02F 9/00* (2013.01); *B01D 17/042* (2013.01); *B01D 17/047* (2013.01); *B09B 3/60* (2022.01); *B09B 3/70* (2022.01); *C02F 1/66* (2013.01); *C02F 1/722* (2013.01); *C02F 3/1268* (2013.01); *C02F 3/301* (2013.01); *C02F 3/341* (2013.01); *C02F 3/343* (2013.01); *C02F 3/346* (2013.01); *B09B 2101/70* (2022.01); *C02F 2001/007* (2013.01); *C02F 3/345* (2013.01); *C02F 2303/02* (2013.01); *C02F 2303/04* (2013.01); *C02F 2305/02* (2013.01); *C02F 2305/14* (2013.01)

(58) Field of Classification Search

CPC .... C02F 9/00; C02F 1/66; C02F 3/341; C02F 3/1268; C02F 3/343; C02F 3/346; C02F 3/301; C02F 2305/026; C02F 3/2853; C02F 2305/14; C02F 3/345; C02F 2305/02; C02F 2101/32; C02F 3/307; C02F 2001/007; C02F 2303/02; C02F 2303/04; C02F 1/722; C02F 1/02; B01D 17/042; B01D 17/047; B09B 3/60; B09B 2101/70; B09B 3/70

See application file for complete search history.

(56) References Cited

U.S. PATENT DOCUMENTS

2004/0213755 A1* 10/2004 Hochwalt .............. A61L 9/014 424/443

2022/0169926 A1* 6/2022 Dhyllon ................. C10B 53/02

FOREIGN PATENT DOCUMENTS

CN 105169446 A * 12/2015 ............... A61L 9/01

CN 107879505 A * 4/2018 ............... C02F 9/00

CN 109231722 A * 1/2019 ............... C02F 9/00

CN 119822429 A * 4/2025

OTHER PUBLICATIONS

Machine Translation of CN-107879505-A.*

Machine Translation of CN-105169446-A.*

Machine Translation of CN-109231722-A.*

Machine Translation of CN-119822429-A.*

* cited by examiner

*Primary Examiner* — Benjamin L Lebron

*Assistant Examiner* — Mahmoud Motaz Abdel Latif

(74) *Attorney, Agent, or Firm* — Hemisphere Law, PLLC

(57) ABSTRACT

The present disclosure relates to a harmless and recycling treatment method for kitchen waste. The method includes: step S1: sorting the kitchen waste, deodorizing the kitchen waste, and then implementing a solid-liquid separation to the kitchen waste to obtain solid and filtrate; step S2: adjusting pH of the filtrate to 12-13, adding a demulsifier to the filtrate, standing still, recovering an upper layer of oil and obtaining a lower layer of clear liquid; drying and burning the solid obtained in the step S1, to obtain biochar; and step S3: implementing an advanced oxidation treatment and a biochemical treatment to the lower layer of clear liquid obtained in the step S2, to obtain water. The method can effectively recycle the kitchen waste into resources, alleviate the social and environmental problems caused by the current kitchen waste, and the method is suitable for popularization and application.

8 Claims, No Drawings

HARMLESS AND RECYCLING TREATMENT METHOD FOR KITCHEN WASTE

CROSS-REFERENCE TO RELATED APPLICATION

This application claims priority to Chinese Patent Application No. 202311216986.1, filed on Sep. 20, 2023 before the China National Intellectual Property Administration, the disclosure of which is incorporated herein by reference in entirety.

TECHNICAL FIELD

The present disclosure relates to the field of harmless treatment and recycling utilization of solid waste, and in particular to a harmless and recycling treatment method for kitchen waste.

BACKGROUND

Food waste/kitchen waste in various regions has different characteristics. In general, due to the special cooking methods, most of the food waste has the characteristics of high water content, high oil content, and perishability. Due to the high water content, the incineration of food waste will reduce the temperature in the furnace, and the incomplete combustion will form dioxins. The direct landfill of food waste is not conducive to the stability of the landfill stack and the treatment of landfill leachate. “Garbage-nourished pigs” and “waste cooking oils” that derive from the food waste will cause great harm to human health. Therefore, the treatment and disposal of kitchen waste has attracted more and more attention from the whole society.

In the oily sewage in kitchen waste, the composition and existence form of the oil are complex, and it generally exists in the form of suspended oil, dispersed oil, emulsified oil, dissolved oil or oily solid, wherein the emulsified oil/grease in high concentration is the most difficult to deal with. At present, although there are many types of oil-water separation technologies for restaurant waste water, each technology has its limitations, and it is impossible to simultaneously reduce costs and improve treatment effects. How to implement oil-water separation to food waste with low cost and good effect is a major problem in the food waste treatment industry.

SUMMARY

In order to solve the above-mentioned technical problems, the present disclosure provides a harmless and recycling treatment method for kitchen waste, using a demulsifier for effective demulsification, improving the oil-water separation effect. It is easy to obtain raw materials of the demulsifier, and easy to prepare the demulsifier, thereby reducing the disposal costs of kitchen waste.

The present disclosure is specifically realized through the following technical solutions.

A harmless and recycling treatment method for kitchen waste, comprising:

step S1: sorting the kitchen waste, deodorizing the kitchen waste, and then implementing a solid-liquid separation to the kitchen waste to obtain solid and filtrate;

step S2: adjusting pH of the filtrate obtained in the step S1 to 12-13, adding a demulsifier to the filtrate, heating to 40-60° C. under stirring to react; after the reaction, standing still, recovering an upper layer of oil for usage as a raw material for biodiesel and obtaining a lower layer of clear liquid; drying and burning the solid obtained in the step S1, to obtain biochar; and step S3: implementing an advanced oxidation treatment and a biochemical treatment to the lower layer of clear liquid obtained in the step S2, to obtain water, wherein the demulsifier is made from pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:1-3:1-3.

According to some embodiments of the present disclosure, in the step S2, the mass ratio of pulverized coal ash, calcium oxide, magnesium oxide, anhydrous calcium chloride, and polyaluminum chloride is 1:1:1:1-2:1-2, and a mass ratio of anhydrous calcium chloride and polyaluminum chloride is 1:1.

According to some embodiments of the present disclosure, in the step S2, the demulsifier is used in such a way that the anhydrous calcium chloride and the polyaluminum chloride are first mixed to prepare a first mixture, the first mixture is added to the filtrate and heated up to 40-60° C. for stirring, and a second mixture made from the pulverized coal ash, the calcium oxide and the magnesium oxide is added, and then a stir is implemented to allow reaction to continue.

According to some embodiments of the present disclosure, in the step S2, keeping stirring for 20-30 minutes after the first mixture is added, and continuing stirring for 30-60 minutes after the second mixture is added.

According to some embodiments of the present disclosure, in the step S1, the sorted kitchen waste is added with a deodorant for deodorization, and the deodorant is made from *Bacillus licheniformis*, nitrite bacteria, sulfur bacteria and *Thiobacillus denitrificans*, and a mass ratio of *Bacillus licheniformis*, nitrite bacteria, sulfur bacteria and *Thiobacillus denitrificans* is 2-4: 2-4:1-2: 1-2.

According to some embodiments of the present disclosure, in the step S1, an amount of the deodorant added is 0.5%-1% of a mass of the sorted kitchen waste.

According to some embodiments of the present disclosure, in the step S3, adding ferrous salt to the lower layer of clear liquid obtained in the step S2 and keeping stirring, then adding hydrogen peroxide and continuing stirring for 5-10 min; heating wastewater to 40-60° C., to allow reaction for 2-4 h, and then discharging supernatant.

According to some embodiments of the present disclosure, in the step S3, the supernatant is passed into a MBR reaction tank in such a condition of a hollow fiber membrane working as a membrane module, a membrane pore diameter of 0.1-0.2 microns, a sludge concentration of 6-10 g/L, a hydraulic retention time of 5-8 h, a temperature of 20-30° C., a pH of 7.5-8.5, and a dissolved oxygen of 0.1-0.3 mg/L.

According to some embodiments of the present disclosure, in the MBR reaction tank, a composite functional flora includes 15-35% of aerobic ammonium oxidizing bacteria, 25-35% of anaerobic ammonium oxidizing bacteria, 10-15% of denitrifying bacteria, 5-15% of sulfate reducing bacteria, 5-10% of iron reducing ammonia oxidizing bacteria.

Compared with the prior art, the present disclosure has the following beneficial effects:

I. In the present disclosure, the kitchen waste is first sorted and deodorized, and then solid-liquid separation is carried out. The solid is used to prepare biochar, and the liquid goes through the oil-water separation to obtain oil, which is used as biofuel. It should be noted that, the kitchen waste has a high oil content, especially when it is mixed with a cleaning agent, it is easy to form emulsified oil, which is difficult to deal with by using the traditional oil-water separation method. To solve this problem, the present disclosure adds a special demulsifier when performing oil-water separation. The demulsifier is made from pulverized coal ash, calcium oxide, magnesium oxide, anhydrous calcium chloride, and polyaluminum chloride. The pulverized coal ash has a large specific surface area and strong adsorption, it can play roles of electrical neutralization, adsorption and bridging, destroying the stability of the system, absorbing water in the emulsified oil system, the reduction of water helps the demulsification of the emulsified oil system, the calcium oxide and the magnesium oxide help maintain the alkaline environment of the system, and help the dehydration of the system, the anhydrous calcium chloride and the polyaluminum chloride cooperate to absorb water and carry out coagulation and sedimentation at the same time to achieve the effect of demulsification. For specific use, the anhydrous calcium chloride and the polyaluminum chloride are first mixed and added to the emulsified oil, stirred to break the emulsification, and then added with the pulverized coal ash, the calcium oxide and the magnesium oxide to further break the emulsification. Through the above two-step demulsification process, the emulsified oil can finally be divided efficiently into oil and water. The separated water is processed through the advanced oxidation treatment and the biological treatment to obtain water, which can be discharged directly if it reaches the standard.

II. The present disclosure has a simple treatment process and uses simple raw materials of the demulsifier, it reduces the treatment cost, effectively recycles kitchen waste, alleviates the social and environmental problems caused by the current kitchen waste, and it is suitable for popularization and application.

DETAILED DESCRIPTION OF EMBODIMENTS

In order to enable those skilled in the art to better understand and implement the technical solutions of the present disclosure, the present disclosure will be further described below in conjunction with specific examples and data, but the given examples are not intended to limit the present disclosure.

The experimental methods and detection methods described in the following examples, unless otherwise specified, are conventional methods, and the reagents and materials, unless otherwise specified, can be purchased in the market.

Example 1

A harmless and recycling treatment method for kitchen waste comprises the following steps:

S1: sorting the kitchen waste, and adding a deodorant into the kitchen waste for deodorization, the deodorant being made from the following raw materials in parts by weight: 2 parts of *Bacillus licheniformis,* 2 parts of nitrite bacteria, 1 part of sulfur bacteria, 1 part of *Thiobacillus denitrificans*, the amount of deodorant added being 0.5% of the mass of the sorted kitchen waste, after deodorization, implementing a solid-liquid separation to the kitchen waste to obtain solid and filtrate;

Step S2: adjusting the pH of the filtrate obtained in the step S1 to 12, and adding a demulsifier to the filtrate; the demulsifier being used in such a way that the anhydrous calcium chloride and the polyaluminum chloride are first mixed to prepare a first mixture, the first mixture is added to the filtrate and heated up to 40° C., and stirred for 20 min, and then a second mixture made from the pulverized coal ash, the calcium oxide and the magnesium oxide is added, and then a stir is implemented for 30 min to allow reaction to continue; after the reaction, standing still, recovering an upper layer of oil for usage as a raw material for biodiesel and obtaining a lower layer of clear liquid; drying and burning the solid obtained in the step S1, to obtain biochar;

The demulsifier is made from pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:1:1, and a mass ratio of anhydrous calcium chloride and polyaluminum chloride is 1:1.

Step S3: adding ferrous salt to the lower layer of clear liquid obtained in the step S2 and keeping stirring, then adding hydrogen peroxide and continuing stirring for 5 min; heating wastewater to 40° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 6 g/L, a hydraulic retention time of 5 h, a temperature of 20° C., a pH of 7.5, and a dissolved oxygen of 0.1 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Example 2

A harmless and recycling treatment method for kitchen waste comprises the following steps:

Step S1: sorting the kitchen waste, and adding a deodorant into the kitchen waste for deodorization, the deodorant being made from the following raw materials in parts by weight: 4 parts of *Bacillus licheniformis,* 4 parts of nitrite bacteria, 2 part of sulfur bacteria, 2 part of *Thiobacillus denitrificans*, the amount of deodorant added being 1% of the mass of the sorted kitchen waste, after deodorization, implementing a solid-liquid separation to the kitchen waste to obtain solid and filtrate;

Step S2: adjusting the pH of the filtrate obtained in the step S1 to 13, and adding a demulsifier to the filtrate; the demulsifier being used in such a way that the anhydrous calcium chloride and the polyaluminum chloride are first mixed to prepare a first mixture, the first mixture is added to the filtrate and heated up to 60° C., and stirred for 30 min, and then a second mixture made from the pulverized coal ash, the calcium oxide and the magnesium oxide is added, and then a stir is implemented for 60 min to allow reaction to continue; after the reaction, standing still, recovering an upper layer of oil for usage as a raw material for biodiesel and obtaining a lower layer of clear liquid; drying and burning the solid obtained in the step S1, to obtain biochar;

The demulsifier is made from pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:3:3, and a mass ratio of anhydrous calcium chloride and polyaluminum chloride is 1:1.

Step S3: adding ferrous salt to the lower layer of clear liquid obtained in the step S2 and keeping stirring, then adding hydrogen peroxide and continuing stirring for 10 min; heating wastewater to 60° C., to allow reaction for 4 h, and then discharging supernatant; passing the supernatant into a MBR reaction tank in such a condition of a hollow fiber membrane working as a membrane module, a membrane pore diameter of 0.1-0.2 microns, a sludge concentration of 10 g/L, a hydraulic retention time of 8 h, a temperature of 30° C., a pH of 8.5, and a dissolved oxygen of 0.3 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Example 3

A harmless and recycling treatment method for kitchen waste comprises the following steps:

Step S1: sorting the kitchen waste, and adding a deodorant into the kitchen waste for deodorization, the deodorant being made from the following raw materials in parts by weight: 3 parts of *Bacillus licheniformis,* 3 parts of nitrite bacteria, 2 part of sulfur bacteria, 1 part of *Thiobacillus denitrificans*, the amount of deodorant added being 0.6% of the mass of the sorted kitchen waste, after deodorization, implementing a solid-liquid separation to the kitchen waste to obtain solid and filtrate;

Step S2: adjusting the pH of the filtrate obtained in the step S1 to 12, and adding a demulsifier to the filtrate; the demulsifier being used in such a way that the anhydrous calcium chloride and the polyaluminum chloride are first mixed to prepare a first mixture, the first mixture is added to the filtrate and heated up to 50° C., and stirred for 30 min, and then a second mixture made from the pulverized coal ash, the calcium oxide and the magnesium oxide is added, and then a stir is implemented for 30 min to allow reaction to continue; after the reaction, standing still, recovering an upper layer of oil for usage as a raw material for biodiesel and obtaining a lower layer of clear liquid; drying and burning the solid obtained in the step S1, to obtain biochar;

The demulsifier is made from pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:2:2.

Step S3: adding ferrous salt to the lower layer of clear liquid obtained in the step S2 and keeping stirring, then adding hydrogen peroxide and continuing stirring for 5-10 min; heating wastewater to 50° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 8 g/L, a hydraulic retention time of 6 h, a temperature of 25° C., a pH of 7.5, and a dissolved oxygen of 0.2 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Example 4

A harmless and recycling treatment method for kitchen waste comprises the following steps:

Step S1: sorting the kitchen waste, and adding a deodorant into the kitchen waste for deodorization, the deodorant being made from the following raw materials in parts by weight: 2 parts of *Bacillus licheniformis,* 4 parts of nitrite bacteria, 1 part of sulfur bacteria, 2 part of *Thiobacillus denitrificans*, the amount of deodorant added being 1% of the mass of the sorted kitchen waste, after deodorization, implementing a solid-liquid separation to the kitchen waste to obtain solid and filtrate;

Step S2: adjusting the pH of the filtrate obtained in the step S1 to 12, and adding a demulsifier to the filtrate; the demulsifier being used in such a way that the anhydrous calcium chloride and the polyaluminum chloride are first mixed to prepare a first mixture, the first mixture is added to the filtrate and heated up to 60° C., and stirred for 20 min, and then a second mixture made from the pulverized coal ash, the calcium oxide and the magnesium oxide is added, and then a stir is implemented for 60 min to allow reaction to continue; after the reaction, standing still, recovering an upper layer of oil for usage as a raw material for biodiesel and obtaining a lower layer of clear liquid; drying and burning the solid obtained in the step S1, to obtain biochar;

The demulsifier is made from pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:1:1.

Step S3: adding ferrous salt to the lower layer of clear liquid obtained in the step S2 and keeping stirring, then adding hydrogen peroxide and continuing stirring for 9 min; heating wastewater to 60° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 10 g/L, a hydraulic retention time of 5 h, a temperature of 30° C., a pH of 7.5, and a dissolved oxygen of 0.3 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Comparative Example 1

Compared with the Example 1, it does not add demulsifier in the Comparative Example 1, thus it specifically comprises the following steps:

Step S1: sorting the kitchen waste, and adding a deodorant into the kitchen waste for deodorization, the deodorant being made from the following raw materials in parts by weight: 2 parts of *Bacillus licheniformis,* 2 parts of nitrite bacteria, 1 part of sulfur bacteria, 1 part of *Thiobacillus denitrificans*, the amount of deodorant added being 0.5% of the mass of the sorted kitchen waste, after deodorization, implementing a solid-liquid separation to the kitchen waste to obtain solid and filtrate;

Step S2: standing still the filtrate obtained in the step S1, recovering an upper layer of oil for usage as a raw material for biodiesel and obtaining a lower layer of liquid; drying and burning the solid obtained in the step S1, to obtain biochar;

Step S3: adding ferrous salt to the lower layer of liquid obtained in the step S2 and keeping stirring, then adding hydrogen peroxide and continuing stirring for 5 min; heating wastewater to 40° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 6 g/L, a hydraulic retention time of 5 h, a temperature of 20° C., a pH of 7.5, and a dissolved oxygen of 0.1 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Comparative Example 2

Compared with the Example 1, the demulsifier does not contain anhydrous calcium chloride and polyaluminum chloride, thus it specifically comprises the following steps:

Step S1: sorting the kitchen waste, and adding a deodorant into the kitchen waste for deodorization, the deodorant being made from the following raw materials in parts by weight: 2 parts of *Bacillus licheniformis,* 2 parts of nitrite bacteria, 1 part of sulfur bacteria, 1 part of *Thiobacillus denitrificans*, the amount of deodorant added being 0.5% of the mass of the sorted kitchen waste, after deodorization, implementing a solid-liquid separation to the kitchen waste to obtain solid and filtrate;

Step S2: adjusting the pH of the filtrate obtained in the step S1 to 12, and adding a demulsifier to the filtrate; the demulsifier being used in such a way that a second mixture made from the pulverized coal ash, the calcium oxide and the magnesium oxide is added, and then a stir is implemented for 30 min to allow reaction to continue; after the reaction, standing still, recovering an upper layer of oil for usage as a raw material for biodiesel and obtaining a lower layer of liquid; drying and burning the solid obtained in the step S1, to obtain biochar;

The demulsifier is made from pulverized coal ash, calcium oxide, and magnesium oxide, and a mass ratio of pulverized coal ash, calcium oxide, and magnesium oxide is 1:1:1.

Step S3: adding ferrous salt to the lower layer of liquid obtained in the step S2 and keeping stirring, then adding hydrogen peroxide and continuing stirring for 5 min; heating wastewater to 40° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 6 g/L, a hydraulic retention time of 5 h, a temperature of 20° C., a pH of 7.5, and a dissolved oxygen of 0.1 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

Comparative Example 3

Compared with the Example 1, the demulsifier does not contain pulverized coal ash, calcium oxide, and magnesium oxide, thus it specifically comprises the following steps:

Step S1: sorting the kitchen waste, and adding a deodorant into the kitchen waste for deodorization, the deodorant being made from the following raw materials in parts by weight: 2 parts of *Bacillus licheniformis,* 2 parts of nitrite bacteria, 1 part of sulfur bacteria, 1 part of *Thiobacillus denitrificans*, the amount of deodorant added being 0.5% of the mass of the sorted kitchen waste, after deodorization, implementing a solid-liquid separation to the kitchen waste to obtain solid and filtrate;

Step S2: adjusting the pH of the filtrate obtained in the step S1 to 12, and adding a demulsifier to the filtrate; the demulsifier being used in such a way that the anhydrous calcium chloride and the polyaluminum chloride are first mixed to prepare a first mixture, the first mixture is added to the filtrate and heated up to 40° C., and stirred for 20 min; after the reaction, standing still, recovering an upper layer of oil for usage as a raw material for biodiesel and obtaining a lower layer of clear liquid; drying and burning the solid obtained in the step S1, to obtain biochar;

Amass ratio of anhydrous calcium chloride and polyaluminum chloride is 1:1.

Step S3: adding ferrous salt to the lower layer of clear liquid obtained in the step S2 and keeping stirring, then adding hydrogen peroxide and continuing stirring for 5 min; heating wastewater to 40° C., to allow reaction for 2 h, and then discharging supernatant; passing the supernatant into a MBR reaction tank in such a condition of a hollow fiber membrane working as a membrane module, a membrane pore diameter of 0.1-0.2 microns, a sludge concentration of 6 g/L, a hydraulic retention time of 5 h, a temperature of 20° C., a pH of 7.5, and a dissolved oxygen of 0.1 mg/L. In the MBR reaction tank, a composite functional flora includes 35% of aerobic ammonium oxidizing bacteria, 25% of anaerobic ammonium oxidizing bacteria, 15% of denitrifying bacteria, 15% of sulfate reducing bacteria, 10% of iron reducing ammonia oxidizing bacteria. After the process, water is obtained.

The performance tests of the above-mentioned Examples and Comparative Examples are carried out below.

(1) Oil-water separation effect in Examples and Comparative Examples: Take 100 mL of the reaction product in Step S2 in Examples 1-4 and Comparative Examples 1-3 and let them stand still, observe the separation of oil phase and water phase in S2 after standing still, the results are as shown in Table 1:

TABLE 1

| separation of oil phase and water phase in S2 in Examples 1-4 and Comparative Examples 1-3 after standing still | | | |
|---|---|---|---|
| Example Name | Dehydration Amount (mL) | Water color | Boundary |
| Example 1 | 60 | Clear | Sharp |
| Example 2 | 58 | Clear | Sharp |
| Example 3 | 62 | Clear | Sharp |
| Example 4 | 61 | Clear | Sharp |
| Comparative Example 1 | 13 | Unclear | Fuzzy |
| Comparative Example 2 | 35 | Unclear | Fuzzy |
| Comparative Example 3 | 42 | Unclear | Fuzzy |

It can be seen from Table 1 that the dehydration amount of Examples 1-4 of the present disclosure is higher than that of Comparative Examples 1-3. No demulsifier is added in Comparative Example 1, the final oil-water separation effect is poor, the dehydration amount is the smallest, and the oil-water interface/boundary is unclear, and the water phase is not clear, it shows that the oil phase and water phase with higher quality cannot be obtained finally through ordinary standing treatment, it also fully shows that the processing of kitchen waste in the present disclosure is relatively difficult. Although a demulsifier is added in Comparative Example 2, anhydrous calcium chloride and polyaluminum chloride are not added, the oil-water separation effect is improved compared with Comparative Example 1, but compared with Examples 1-4, the effect is still not good, which shows that anhydrous calcium chloride and polyaluminum chloride in the present disclosure are effective for demulsification, and are essential ingredients. No pulverized coal ash, calcium oxide and magnesium oxide are added in Comparative Example 3, its oil-water separation effect is also better than that of Comparative Example 1, but compared with Examples 1-4, the oil-water separation effect is poor, which also shows that the pulverized coal ash, calcium oxide and magnesium oxide are effective for demulsification.

(2) Component testing was carried out on the final water of S3 in Examples 1-4 and Comparative Examples 1-3, and the results are shown in Table 2.

TABLE 2

| The components of the final water in Examples 1-4 and Comparative Examples 1-3 | | |
|---|---|---|
| Example Name | Oil (mg/L) | COD (mg/L) |
| Example 1 | 2.1 | 35 |
| Example 2 | 1.9 | 40 |
| Example 3 | 2.4 | 38 |
| Example 4 | 2.1 | 37 |
| Comparative Example 1 | 10.4 | 105 |
| Comparative Example 2 | 5.3 | 82 |
| Comparative Example 3 | 4.2 | 79 |

As can be seen from Table 2, the oil content in the final water obtained in Examples 1-4 is less, and the oil content in Comparative Examples 1-3 is higher, this conclusion is consistent with the results in Table 1, indicating that the usage of demulsifier in the demulsification process is very effective. Correspondingly, the COD content in Examples 1-4 is also less, it meets discharge requirement, and therefore can be directly discharged.

When processing kitchen waste, the present disclosure not only effectively separates oil from water, but also can use the separated oil as a raw material for biodiesel, and the solid is made into biochar, turning waste into treasure, and realizing resource-recycled treatment of kitchen waste. Further the separated water meets the discharge standard after treatment, realizing the harmless treatment of kitchen waste, which is economical and environmentally friendly.

Obviously, various modifications and variations may be made to the present disclosure by those skilled in the art without departing from the spirit and scope of the present disclosure. Thus, the present disclosure is intended to include these modifications and variations if these modifications and variations of the present disclosure fall within the scope of the claims of the present disclosure and their equivalent.

What is claimed is:

1. A recycling treatment method for kitchen waste, comprising:

step S1: sorting the kitchen waste, deodorizing the kitchen waste, and then implementing a solid-liquid separation to the kitchen waste to obtain solid and filtrate;

step S2: adjusting pH of the filtrate obtained in the step S1 to 12-13, adding a demulsifier to the filtrate, heating to 40-60° C. under stirring to react; after the reaction, standing still, recovering an upper layer of oil and obtaining a lower layer of clear liquid; drying and burning the solid obtained in the step S1, to obtain biochar; and step S3: implementing an advanced oxidation treatment and a biochemical treatment to the lower layer of clear liquid obtained in the step S2, to obtain water, wherein the demulsifier consists of pulverized coal ash, calcium oxide, magnesium oxide, anhydrous calcium chloride, and polyaluminum chloride, and a mass ratio of pulverized coal ash, calcium oxide, magnesium oxide, anhydrous calcium chloride, and polyaluminum chloride is 1:1:1:1-3:1-3;

wherein in the step S2, the adding a demulsifier to the filtrate, heating to 40-60° C. under stirring to react comprises:

mixing the anhydrous calcium chloride and the polyaluminum chloride to prepare a first mixture, adding the first mixture to the filtrate and heating up to 40-60° C. followed by stirring to obtain a reacted mixture, and adding a second mixture consisting of the pulverized coal ash, the calcium oxide and the magnesium oxide to the reacted mixture followed by stirring for reaction.

2. The harmless and recycling treatment method for kitchen waste according to claim 1, wherein, in the step S2, the mass ratio of pulverized coal ash, calcium oxide, magnesium oxide, anhydrous calcium chloride, and polyaluminum chloride is 1:1:1:1-2:1-2, and a mass ratio of anhydrous calcium chloride and polyaluminum chloride is 1:1.

3. The recycling treatment method for kitchen waste according to claim 1, wherein, in the step S2, keeping stirring for 20-30 minutes after the first mixture is added, and continuing stirring for 30-60 minutes after the second mixture is added.

4. The recycling treatment method for kitchen waste according to claim 1, wherein, in the step S1, the sorted kitchen waste is added with a deodorant for deodorization, and the deodorant comprises *Bacillus licheniformis*, nitrite bacteria, sulfur bacteria and *Thiobacillus denitrificans*, and a mass ratio of the *Bacillus licheniformis*, the nitrite bacteria, the sulfur bacteria and the *Thiobacillus denitrificans* is 2-4:2-4:1-2:1-2.

5. The recycling treatment method for kitchen waste according to claim 4, wherein, in the step S1, an amount of the deodorant added is 0.5%-1% of a mass of the sorted kitchen waste.

6. The recycling treatment method for kitchen waste according to claim 1, wherein, in the step S3, adding ferrous salt to the lower layer of clear liquid obtained in the step S2 and keeping stirring, then adding hydrogen peroxide and continuing stirring for 5-10 min; heating wastewater to 40-60° C., to allow reaction for 2-4 h, and then discharging supernatant.

7. The recycling treatment method for kitchen waste according to claim 6, wherein, in the step S3, the supernatant is passed into a membrane bio-reactor (MBR) reaction tank in such a condition of a hollow fiber membrane working as a membrane module, a membrane pore diameter of 0.1-0.2 microns, a sludge concentration of 6-10 g/L, a hydraulic retention time of 5-8 h, a temperature of 20-30° C., a pH of 7.5-8.5, and a dissolved oxygen of 0.1-0.3 mg/L.

8. The harmless and recycling treatment method for kitchen waste according to claim 7, wherein, in the MBR reaction tank, a composite functional flora includes 15-35% of aerobic ammonium oxidizing bacteria, 25-35% of anaerobic ammonium oxidizing bacteria, 10-15% of denitrifying bacteria, 5-15% of sulfate reducing bacteria, 5-10% of iron reducing ammonia oxidizing bacteria.

* * * * *